United States Patent [19]

Sanchez

[11] Patent Number: 5,112,405
[45] Date of Patent: May 12, 1992

[54] LIGHTWEIGHT CONCRETE BUILDING PRODUCT

[76] Inventor: Michael A. Sanchez, 442 W. San Bernardino Ave., Rialto, Calif. 92376

[21] Appl. No.: 615,441

[22] Filed: Nov. 16, 1990

Related U.S. Application Data

[63] Continuation-in-part of Ser. No. 301,241, Jan. 24, 1989, abandoned.

[51] Int. Cl.⁵ .................. C04B 24/00; C04B 24/16
[52] U.S. Cl. .................... 106/608; 106/665; 106/666; 106/725; 106/726; 106/727; 106/728
[58] Field of Search ............. 106/600, 608, 665, 666, 106/725, 726, 727, 728

[56] References Cited

U.S. PATENT DOCUMENTS

| | | | |
|---|---|---|---|
| 4,050,948 | 9/1977 | Gandy et al. | 106/76 |
| 4,060,425 | 11/1977 | Harada et al. | 106/314 |
| 4,204,876 | 5/1980 | Bowden | 106/314 |

OTHER PUBLICATIONS

Kosmatka et al., *Design and Control of Concrete Mixtures*, 13 Edition, 1988 (pp. 19 and 64).

*Primary Examiner*—Mark L. Bell
*Assistant Examiner*—Deborah Jones
*Attorney, Agent, or Firm*—Christie, Parker & Hale

[57] ABSTRACT

Compositions for lightweight, waterproof, cementitious materials comprise portland cement, aggregates, two admixtures, and water. A first admixture comprises a major portion of calcium chloride and minor portions of sodium silicate and a wetting agent. A second admixture comprises an emulsion of ammonium stearate. Methods for producing cementitious materials include a process for manufacturing strong, lightweight, waterproof building products such as roofing tile, imitation bricks, and the like.

10 Claims, 1 Drawing Sheet

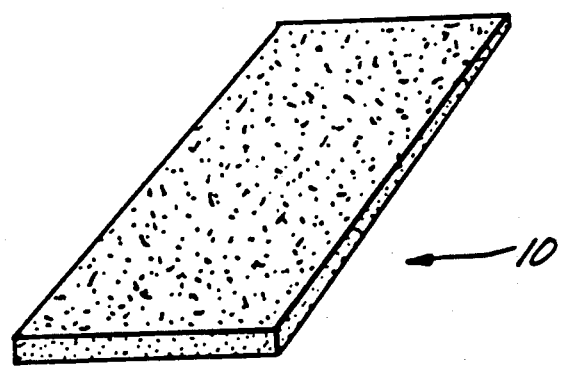

LIGHTWEIGHT CONCRETE BUILDING PRODUCT

BACKGROUND

This application is a continuation-in-part of U.S. patent application No. 07/301,241, filed Jan. 24, 1989, now abandoned, the subject matter of which is hereby incorporated by reference.

This invention relates to methods and materials for formulating lightweight, waterproof concretes and, more particularly, is directed to a composition for strong, lightweight, waterproof building products such as roofing tile or the like, and a method for making same.

Hydraulic cements—solids that set and harden irreversibly in the presence of water—have been known at least since Roman times. Since the discovery of portland cement in 1824, cement technology has evolved considerably. Although many of the reactions involved in the setting process are still poorly understood, it is known that when the calcium silicates in portland cement are mixed with water, some of the water goes towards the production of hydrated calcium silicates. The rest of the water evaporates, leaving pores in the cement. The strength of a cement depends on this porosity.

It is often desirable to utilize cements and concretes which are lightweight, yet strong and durable. Heretofore, lightweight cement designs have suffered from the drawback that the lightweight aggregates (i.e., the natural sands, gravels, and crushed stones used for mixing with a cementing material) employed are highly water absorbent. Consequently, higher than normal water demand occurs, resulting in slow setup times, and weak, highly porous cement.

The size of the pores within a cement also affects the cement's properties. In normal cements, penetration of the hardened cement by carbon dioxide, moisture, and chemically aggressive solutions (e.g., sea water or sulfate-containing ground waters) results from small-sized pores. Initially, the pores in freshly poured cement paste are the water filled spaces (capillaries) between cement particles. As these spaces become subdivided by the formation of hydration products (principally calcium hydroxides), the originally continuous pore system becomes somewhat more discrete.

In cements which have a high water-to-cement ratio, as encountered in typical lightweight designs, the result, however, is still large numbers of the capillary spaces interconnected through capillaries which are 10 nm or larger. These capillaries not only lower the strength, but also permit the easy penetration of aggressive solutions. Furthermore, these capillary spaces may become filled with water which, when it freezes, may result in destructive expansion and deterioration of the concrete. Depending upon the environmental and compositional conditions, the closing of the cement pores can require months or even years. Until the hydration process is well under way the calcium hydroxides remain water soluble and are susceptible to leaching out (efflorescence). As they migrate through the matrix they can retard and interrupt the hydration process.

It is desirable to develop closed pore spaces or "bubbles" in the cement since these lower the density without absorption of water or leakage of water through the cement. This is particularly significant in cement roofing tiles or the like where water repellency and low density are significant criteria for a successful product. It is also desirable that the roofing tiles harden rapidly so that they can be removed from the molds quickly after casting.

Ordinary concretes typically suffer an additional drawback: under intense heat they tend to spall or explode.

SUMMARY OF THE INVENTION

The present invention addresses the above-identified problems by providing a unique cementitious composition comprising portland cement, two unique admixtures, water and suitable aggregates. A method for producing lightweight, waterproof concrete building materials is also provided.

The first admixture essentially comprises an aqueous solution of calcium chloride, sodium silicate, and a wetting agent such as triethanolamine. When added to portland cement and water, this admixture initiates the chemical reactions which provide long term waterproofing and strength characteristics. The first admixture provides quick setting and early strength gain characteristics to the overall concrete formulation.

The second admixture comprises an emulsion of ammonium stearate. The ammonium stearate reacts rapidly with the calcium chloride to form calcium stearate which provides the initial waterproofing characteristics of the overall concrete formulation. The ammonia released in this reaction forms bubbles in the cement mixture which provide a low density, resulting in a strong, lightweight, permanent, watertight product.

A method for producing strong, lightweight, waterproof building materials is provided, and comprises forming a cement slurry of portland cement, water, and the two admixtures, forming an extrudable or castable material by adding various aggregates and other dry components to the slurry, fabricating the castable or extrudable material into a building product such as roofing tiles, and curing the product.

The building products so produced are strong, light, and waterproof, and neither spall nor explode when subjected to temperatures as high as 2700° F.

BRIEF DESCRIPTION OF THE DRAWING

The single drawing shows a perspective view of a roofing tile, one of the embodiments of the present invention.

DETAILED DESCRIPTION

A cementitious composition is provided, and yields a strong, lightweight, waterproof concrete when cured. The composition comprises portland cement, aggregates and other dry components, two cement conditioning admixtures, and water. The two admixtures cooperatively interact, and when used with proper aggregates and aggregate-to-cement ratios, yield a fast setting, early strength and permanently waterproof material.

A first admixture comprises an aqueous solution of having as a major ingredient calcium chloride, with minor amounts of sodium silicate and a wetting agent. Suitable wetting agents include triethanolamine, calcium nitrate, calcium nitrite, sulphonated lignins, sulphonated polymers, and various carboxylic acid derivatives, particularly those derived from tartaric acid, citric acid, saccharic acid, and tetrahydroxyadipic acid. Triethanolamine (TEA) is a preferred wetting agent.

Quantitatively, the first admixture preferably comprises from 1 percent up to 40 percent by weight calcium chloride, from 0.1 to 0.3 percent by weight sodium silicate (preferably stoichiometric sodium silicate, $Na_2O.SiO_2$), and from 0.2 to 2 percent by weight triethanolamine, with the balance of the admixture being comprised of water. The admixture may be more dilute since it is mixed with water when making concrete, but there is little advantage to dilution which mainly increases the volume of admixture to be handled. A suitable range for the calcium chloride is from 25 to 45 percent by weight in the solution.

The first admixture is prepared by adding triethanolamine to an aqueous solution of sodium silicate, adding a first portion of a calcium chloride solution to form a semi-viscous mixture, and diluting the mixture with a remaining portion of the calcium chloride solution. In this manner, precipitate formation is avoided, as the triethanolamine holds the sodium silicate in solution. Solutions of 34 percent calcium chloride and 8.3 percent sodium silicate, respectively, have been conveniently used to prepare the first admixture.

As a specific example, triethanolamine is added to an 8.3% solution of sodium silicate, in an amount up to 48% TEA. Preferably, 45% TEA is added to the sodium silicate solution. If the sodium silicate solution is added to the TEA, precipitation is likely to occur. Calcium chloride as a 34% solution is then added to this mixture while stirring. This prevents unwanted precipitation. A light, cream textured, semi-viscous mixture without particles or precipitates is formed. If the mixture of TEA and sodium silicate is added to a calcium chloride solution, precipitation is likely to occur.

It will be appreciated by those skilled in the art that regardless of the dilution value of the solutions used to prepare the admixture, the absolute quantities of calcium chloride, sodium silicate, and triethanolamine determine the effect of the admixture within a given quantity of cement.

A preferred composition of the first admixture comprises 1.5 parts of 8% sodium silicate solution and 0.625 parts of triethanolamine per hundred parts by weight of 34% calcium chloride solution. The dilution can be as much as desired, but it is preferred that the concentrations be relatively high so that less admixture is handled. The admixture may be diluted before adding to the portland cement mixture.

Stated in terms of "solids" instead of solutions, a preferred example of the first admixture comprises 100 parts of calcium chloride, 1.84 parts of TEA and 0.35 parts of sodium silicate.

The amount of admixture used is from 1 to 3.3% by weight calcium chloride solids relative to the weight of the portland cement. Higher amounts tend to slow the initial set up time and reduce the quality of the finished product. A preferred amount of the first admixture introduces 2.75% calcium chloride solids relative to the cement.

The second admixture comprises an emulsion of ammonium stearate. A 33 percent emulsion of ammonium stearate has been conveniently employed in the present invention. As with the first admixture, however, the properties of the final cementitious product are determined by the absolute amount of ammonium stearate per unit of cement. Up to 6% ammonium stearate relative to the cement may be used. Greater than 6% causes spotting of the stearate on mold surfaces. Quaternary ammonium stearate may also be used.

Preferably, the first admixture is added to a cement-water slurry prior to the addition of aggregates and other components. The ratio of calcium chloride by weight, in relation to the weight of the cement, determines the amount of the first admixture in any given formulation. This ratio can vary from about 1 percent to about 3.3 percent by weight to that of the cement. Preferred is a ratio of 2.75 percent calcium chloride relative to the weight of the cement. This can vary somewhat depending on temperature and humidity variations in the ambient environment.

Although not required, the beneficial characteristics of calcium chloride as a cement conditioner are enhanced through the use of triethanolamine, or other wetting agents, as a dispersing agent. This component, in conjunction with the calcium chloride, "wets" the cement particles quickly and efficiently. Additionally, the triethanolamine disperses the sodium silicate solution evenly and thoroughly. This promotes uniformity of setting time and early strength gain.

One may form a light weight cement composition suitable for roofing tiles with separate additions of calcium chloride solution and ammonium stearate suspension to an aqueous slurry containing cement, aggregates and reinforcing fibers for providing strength to the tiles. The reaction of calcium chloride and ammonium stearate provides waterproofing and tiny dispersed bubbles which lower the density of the product.

Even though the conditioned cement slurry may be used with lightweight aggregates to yield a lightweight concrete, the conditioned cement paste itself is denser than normal pastes, because of the presence of the first admixture. The triethanolamine directly enhances early strength gain to the cement by wetting the cement with the calcium chloride containing liquid. Calcium chloride is known for its accelerating effect on cement, speeding the initial setting or curing of the mixture.

As cement cures it generates calcium hydroxides. It is believed that the sodium silicate fraction of the first admixture reacts with these hydroxides. It apparently acts as a catalyst by initiating, accelerating and promoting complete hydration of the cement paste within the mix. With further hydration, the water filled spaces become increasingly filled with reaction products to produce hardening and strength development.

As compared to other lightweight cements, the originally continuous pore system becomes more discrete, with pores or capillary cavities separated from each other by gel formations in which the remaining pores are very much smaller. These gel pores are so small (ca. 3 nm) that most of the water contained in them is strongly affected by the solid surface force fields. The result is a decrease in mobility of ionic species in solution. Hence, the permeability of the cement paste to both water and dissolved substances is greatly reduced as hydration proceeds. The use of this admixture promotes a denser cement paste to begin with and under stable conditions insures a rapid and complete hydration.

The ammonium stearate mixes readily with cement which has been conditioned with the first admixture, and establishes a water repellant, stable environment in which the sodium silicate catalyzes and promotes efficient hydration reactions in an already densified cement paste. The final result is a well cured, solid, watertight cementitious material.

The ammonium stearate and the calcium ion in the cement paste apparently react to form calcium stearate thoroughly dispersed through the mixture and ammonia. The ammonia is released throughout the viscous mixture and forms tiny bubbles which are trapped and reduce the density of the resultant cured product. The calcium chloride not only speeds reaction with the ammonium stearate, it increases the viscosity of the mix and accelerates set up time, thereby promoting trapping of the bubbles of ammonia in the mixture.

The admixtures may be added to the cement paste in either order. It is preferred, however, to add the calcium chloride admixture first so that the calcium ion is thoroughly dispersed. This provides the location for rapid reaction of the ammonium stearate throughout the paste (believed to be in intervals of seconds). The ammonium stearate would also react with other calcium ion from the cement in the paste (believed to be in the order of minutes), and its addition first, although effective, requires rapid processing and addition of the first admixture so that the released ammonia does not escape from the paste before it sets.

Rapid processing and speedy dispersion of the admixtures is significant in an industrial setting. Typically. 300 to 400 pounds of cement, aggregate and water are mixed in approximately 10 to 12 seconds.

As the cement begins to harden, the stearate forms a water repellant barrier, effectively preventing the migration of moisture through the cement. It should be noted that the metallic stearates (e.g. aluminum, calcium, cobalt, lithium, lead and zinc) are ineffective, and fail to provide the desired waterproofing and stabilizing characteristics in a cement composition.

Water absorbency tests (U.B.C. Standard No. 32-12) confirm the water repellency of the cured cementitious product. After prolonged exposure to elevated temperatures (ca. 220° F.) and then water immersion for 48 hours, only the surface of a cement conditioned with the above-identified admixtures shows any evidence of water absorbency. Specifically, water was absorbed by less than 1/32nd of an inch (0.8 mm) under such conditions.

Eventually the stearate can be expected to decompose due to exposure, but because of the way it is locked up within the cement matrix, this occurs over a relatively long period of time. In a cement roofing tile weighing 4.75 lbs. with an aggregate-to-cement ratio of 3.5 to 1, the time period required to oxidize the fatty acid under normal conditions can be at least two years or more. This is more than enough time for the hydration process to convert a large percentage of the soluble hydroxides into insoluble components within the cement matrix. Once a substantial percentage of this process has taken place, the cement matrix itself becomes a permanently strong and watertight unit.

In addition to the admixtures described above, the present invention provides a novel cementitious formulation that is lightweight, waterproof, fireproof, and has high compressive and tensile strength. The lightweight formulation is particularly well-suited for fabrication into roofing tiles, artificial brick, building panels and the like, as described below.

The waterproof, cementitious formulation essentially comprises portland cement, both of the admixtures described above, and water. Preferably, additional dry components and aggregates are included to enhance the properties of the resulting product. For example, it is desirable to include an aggregate which has a density of from about 40 to about 50 pounds per cubic foot for adjusting the density of the finished concrete-like product. Preferred aggregates include expanded minerals such as expanded shale, volcanic cinders, pumice and mixtures thereof.

Materials such as expanded mica, expanded perlite (preferably treated with silicone) or polymer fragments or beads such as polystyrene may also be added to reduce density of the cured concrete. A fine grade (e.g., Grade 275) is preferred. It is thought that expanded perlite or mica is also responsible for the greatly enhanced heat resistance of the finished product. When a cementitious material is formulated as described herein, the resulting hardened product does not explode or spall, even when subjected to temperatures as high as 2700° F., at which temperature the material appears to melt into a hard, glass-like crust.

Additionally, the cementitious formulation preferably includes chopped reinforcing fibers, such as glass or polymeric fibers, which enhance the tensile strength of the product. Preferred polymers include nylon and polypropylene. The reinforcing fibers are generally about ½ inch (1.27 cm) in length, with a diameter of less than about 100 denier.

Powdered pigments may also be added as desired, for color.

The present invention is not merely limited to a cementitious composition comprised from the materials described above, but also includes a particular process for producing a strong, lightweight, waterproof cementitious material. The preferred process comprises the following steps:

First, a cement slurry is formed by thoroughly mixing together portland cement, water, and one of the admixtures. This initiates the hydration process.

Second, the other admixture is added to the cement slurry and mixed thoroughly. This provides initial waterproofing characteristics, and stabilizes the entire system.

Preferably, the calcium chloride is added first to the cement slurry, with ammonium stearate added second.

Third, the remaining dry components (e.g., aggregates, expanded mica or perlite, reinforcing fibers, and pigments) are added as the mixing process continues.

When all components are thoroughly blended, the result is a medium textured, smooth working, extrudable or castable material which is then fabricated (i.e., molded or extruded) into a desirable shape.

After being shaped, the material is fast-cured in a warm, moist environment for about 2 to 3 hours. Preferably the temperature is from 110° to about 140° F. and the relative humidity is greater than 80%. The material is then demolded.

At this point the material has developed enough strength to be handled and processed as necessary; after 14 days under ambient conditions the material has further cured and has developed a compressive strength in excess of 2,000 pounds per square inch.

As noted, the process and composition described above are particularly suitable for the fabrication of lightweight, waterproof building materials. In an exemplary embodiment, a roofing tile is provided having a density of about 70 to 75 pounds per cubic foot.

Such a tile can be manufactured from the following preferred formulation: 1 part portland cement; 1.5 parts (by volume) expanded shale, pumice or volcanic cinders (or similar aggregate with a density of 40 to 50 pounds per cubic foot); 2 parts (by volume) expanded perlite; 0.015 parts (by weight, relative to that of the cement) half-inch-long polypropylene fibers; 0.10 parts (by weight relative to that of the cement) of the first admixture; 0.10 parts (by weight relative to that of the cement) of the ammonium stearate emulsion; and from 50 to 65 percent water, based on the weight of the cement. Water demand typically varies with atmospheric conditions and the moisture content of the aggregates.

The accompanying drawing shows an exemplary roofing tile 10 made in accordance with the present invention. The product is fabricated as a generally rectangular, imitation wooden shake with dimensions of 22 inches by 12 inches, with a thickness of 1 inch at one end, tapering to ⅜ inch at the opposite end. A tile fabricated as described weighs approximately 5.25 pounds; this corresponds to roughly 588 pounds per roofing square. The product can be nailed, sawed and installed with existing tools and techniques common to the roofing industry. Additionally, such a tile meets all I.C.B.O. requirements relating to strength (U.B.C. Standard No. 32-12), freeze-thaw performance (ASTM Method 67-83), and water absorbency (U.B.C. Standard No. 32-12).

It will be understood that an imitation shake is just one example of cementitious building product which may be made. The technique is suitable for making attractive lightweight imitation brick, building panels with any of a variety of surface textures and colors, waterproof siding, curved or flat roofing tiles, imitation slates and a broad variety of similar construction materials.

Many other modifications and variations will be apparent to one skilled in the art. It is therefore to be understood that within the scope of the appended claims, this invention may be practiced otherwise than as specifically described.

What is claimed is:

1. A method for preparing an aqueous admixture for conditioning cement comprising:
   adding from 0.2 to 2 percent by weight of triethanolamine to an aqueous solution of sodium silicate;
   forming a semi-viscous mixture by adding the triethanolamine and sodium silicate solution to an aqueous solution wherein calcium chloride is present in an amount up to 40 percent by weight; and
   diluting the semi-viscous mixture with additional calcium chloride solution for forming an admixture having a major portion of calcium chloride and minor portions of triethanolamine and sodium silicate.

2. A method for preparing a cement slurry comprising the steps of:
   mixing an admixture prepared according to the method of claim 1 into a cement slurry containing reinforcing fibers; and separately
   mixing a sufficient amount of ammonium stearate into the cement slurry for reaction with calcium ion for forming bubbles which are trapped in the slurry.

3. A method for preparing a cement slurry as recited in claim 2 wherein the calcium chloride containing admixture is added to a cement slurry before the emulsion of ammonium stearate.

4. A process for preparing a waterproof cementitious material comprising:
   forming a cement slurry by thoroughly mixing portland cement, dry components selected from the group consisting of expanded shale, volcanic cinders, pumice, expanded mica, expanded perlite, reinforcing fibers, and water;
   thoroughly mixing into the slurry an admixture comprising a major portion of calcium chloride and minor portions of sodium silicate and a wetting agent selected from the group consisting of triethanolamine, calcium nitrate, calcium nitrate, sulphonated lignins, sulphonated polymers, and carboxylic acids, the proportion of admixture providing from 1 to 3.3% by weight of calcium chloride relative to the weight of portland cement; and thereafter
   adding an aqueous emulsion of ammonium stearate into the cement slurry, the proportion of ammonium stearate being less than 6% by weight relative to the weight of portland cement;
   molding the extrudable material into a shape; and
   curing the molded material.

5. A process as claimed in claim 4 wherein the molded material is at least initially cured at a temperature in the range of from 110° to 140° F. and a relative humidity of at least 80%.

6. A waterproof cementitious building product manufactured by the process of mixing:
   portland cement,
   lightweight aggregate having a density of from 40 to 50 pounds per cubic foot,
   reinforcing fibers selected from the group consisting of polypropylene fibers, nylon fibers and glass fibers, and water; and adding separately to the mixture an admixture comprising an aqueous solution having a major portion of calcium chloride and minor portions of sodium silicate and a wetting agent selected from the group consisting of triethanolamine, calcium nitrate, calcium nitrite, sulphonated lignins, sulphonated polymers and carboxylic acids; and
   a sufficient amount of ammonium stearate for forming bubbles in the building product.

7. A building product as claimed in claim 6 wherein the aggregate is selected from the group consisting of expanded perlite, expanded mica, expanded shale, volcanic cinders, pumice and mixtures thereof.

8. A method for preparing a cement slurry comprising the steps of:
   mixing an aqueous solution of calcium chloride into a cement slurry containing reinforcing fibers; and separately
   mixing a sufficient amount of an emulsion of ammonium stearate into the cement slurry for reaction between the calcium chloride and the ammonium stearate and formation of bubbles trapped in the slurry.

9. A method as recited in claim 8 wherein the calcium chloride is added to the cement slurry before the emulsion of ammonium stearate.

10. A process as claimed in claim 4 wherein the reinforcing fibers are selected from the group consisting of polypropylene fibers, nylon fibers and glass fibers.

* * * * *

UNITED STATES PATENT AND TRADEMARK OFFICE
CERTIFICATE OF CORRECTION

PATENT NO. : 5,112,405
DATED : May 12, 1992
INVENTOR(S) : Michael A. Sanchez

It is certified that error appears in the above-identified patent and that said Letters Patent is hereby corrected as shown below:

Column 8, line 10, change "nitrate" (second occurrence) to -- nitrite --.

Signed and Sealed this

Thirty-first Day of August, 1993

Attest:

BRUCE LEHMAN

Attesting Officer

Commissioner of Patents and Trademarks